United States Patent [19]
Goodenough

[11] Patent Number: 5,878,680
[45] Date of Patent: Mar. 9, 1999

[54] SEEDER WITH LINEAR ACTUATION AND SEED LEVELING SHUFFLER WITH DUST REMOVAL CAPABILITY

[75] Inventor: Graham Goodenough, McMinnville, Tenn.

[73] Assignee: Bouldin & Lawson, Inc., McMinnville, Tenn.

[21] Appl. No.: 771,384

[22] Filed: Dec. 21, 1996

[51] Int. Cl.$^6$ ...................................................... A01C 1/00
[52] U.S. Cl. ........................................... 111/200; 111/922
[58] Field of Search .................................. 111/89, 93, 95, 111/99, 200, 900, 921, 922

[56] References Cited

U.S. PATENT DOCUMENTS 5,664,506  9/1997  Morin .................................. 111/200 X

OTHER PUBLICATIONS

KW Engineering Brochure; "H35 Hand Seeder", Nov. 1995.
KW Engineering Brochure; "Seed–Air–Matic" disclosing models A25, A50, and 100EM, Date Unknown.
Blackmore Company Brochure; "Blackmore Turbo and Needle Seedesr", Date Unknown.
T.W. hamilton Design Limited Brochure; "The Hamilton Drum Seeder", Date Unknown.

*Primary Examiner*—Terry Lee Melius
*Assistant Examiner*—Christopher J. Novosad
*Attorney, Agent, or Firm*—Bick R. Wascher

[57] ABSTRACT

A linear actuated needle seeder comprising a frame, a seed dispenser assembly further including a shuffler assembly and a capture assembly. The seed shuffler assembly further comprises: an energizeable vibrator having a top portion and a bottom portion, and a seed tray attached to the vibrator. The capture assembly further comprises: a master cylinder supported by the frame and having a cylinder shaft with spaced apart ends operably extending therefrom, a vacuum bar attached to the cylinder shaft, and a slide extending upwardly above the frame and having a slide surface angled in a linearly downward direction toward the seed tray and positioned to enable the vacuum bar to rest thereon and oscillate between an up position and down position in response to the reciprocating movements of the cylinder shaft. The vacuum bar includes a plurality of orifices positioned along the length of the vacuum bar each of which is configured to receive a cannulated needle having a free end and an attachment end such that when the attachment end of the needle is placed in communication with the orifice an air flow channel is established and moves from the hollow interior of the vacuum bar through the cannula and out to the atmosphere.

16 Claims, 6 Drawing Sheets

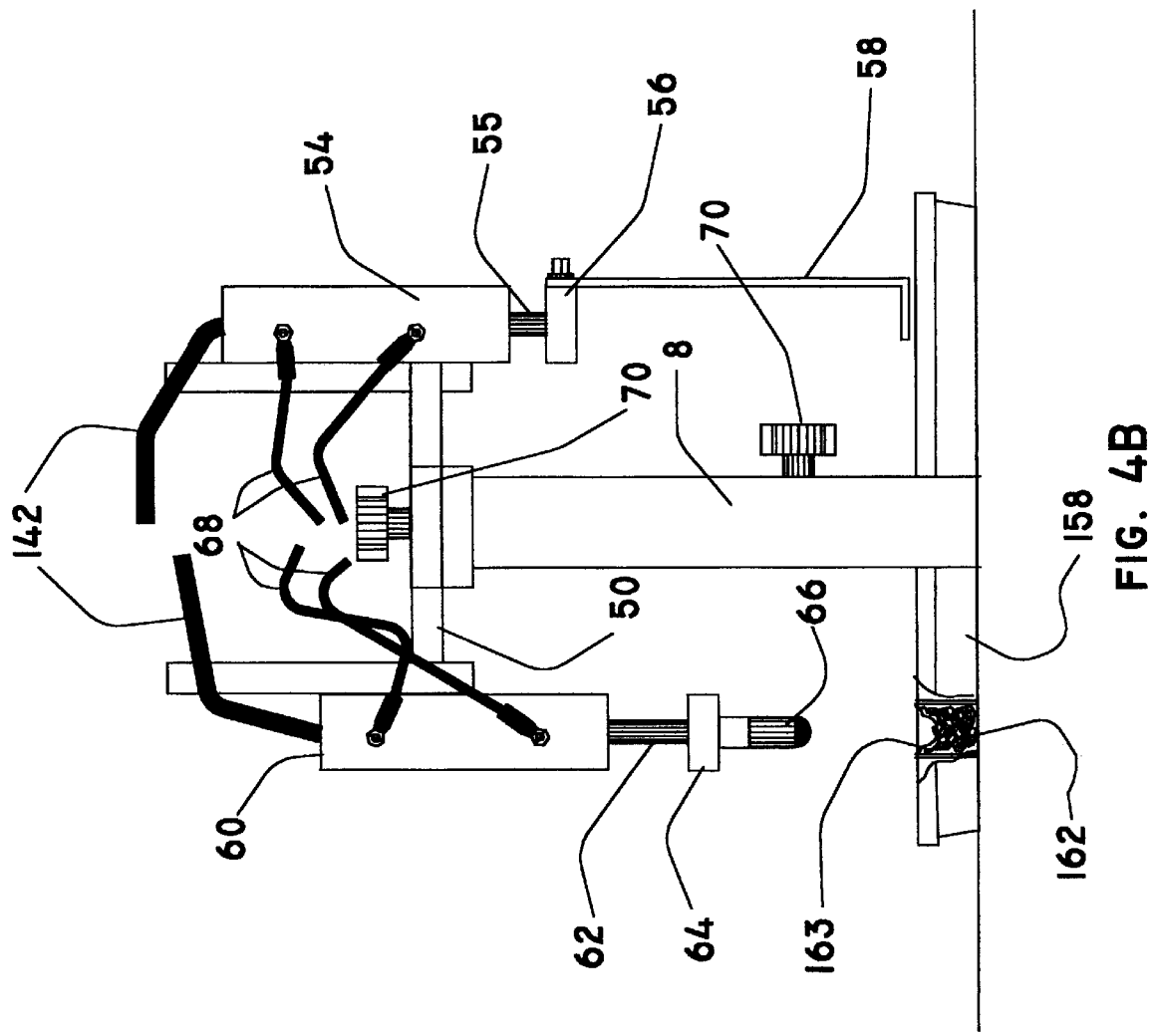

SEEDER WITH LINEAR ACTUATION AND SEED LEVELING SHUFFLER WITH DUST REMOVAL CAPABILITY

BACKGROUND OF THE INVENTION

1. Field of the Invention

The present invention relates generally to seeder machines capable of selectively delivering plant seeds from a reservoir thereof and delivering them into a seed germination tray, but more particularly to seeder machines of the needle variety that incorporate a plurality of vacuum assisted needles or cannula configured to take possession of a single seed or multiple seeds and depositing them into a germination tray to promote their germination and growth.

2. Description of the Related Art

It is well known that virtually all plants and flowers, other than those that are tubor propagated or grafted, begin their growth cycle with the sowing of a single seed. Considering the millions of plants and flowers sold in the wholesale and retail marketplace, and the length of the spring and summer growing seasons, in order to meet consumer market demands time management in the growing industry is considered critical by the growers.

In the past, virtually all seeds were placed manually by hand into the soil filled cells, cavities or compartments of germination trays or "flat". The germination flats are then watered and cared for to enable the seed to germinate into a small seedling having foliage only inches tall. When the seedling is only inches tall, it is known that it begins to become root bound within the germination tray and must be transplanted into a larger tray or cup-like container having a much greater volume than the cells of the germination flat in which the seeds were initially placed. Only within the past several years have machines been constructed to perform this transplanting function and they have greatly advanced the efficiency of the growing industry. One such machine, considered by many as the industry standard with respect to efficiency and versatility is the PLUGPLANTER automated transplanter manfactured by Bouldin & Lawson, Inc. of McMinnville, Tenn.

The advent of the automated seeding machine is believed to be another highly useful and efficient machine which has been well received by the planting ad growing industry. There are two principal types of automated seeding machine. They are: the drum seeder and the needle seeder. A drum seeder typically includes a rotating drum configured to roll over a germination flat and transfer a single seed from the surface of the drum into the cavities of the flat. The operable configuration of the drum is believed to be critical for effective seed deposition and may be varied depending upon the type and configuration of the flat being used.

A needle seeder typically includes a needle carrier of some type configured with a plurality of needles including a cannulated portion through which a vacuum or suction is established. The needle size, corresponding to the internal diameter of the canula, is user selected depending upon the type and configuration of the seed to be sown. Once the suction force is established at the tip or distal end of the canula, the needle assembly may be inserted into a quantity of seed at which time a single seed or several seeds become lodged against the opening in the cannula due to the force of the suction.

The needles are then typically moved to a sowing position at which time the suction is relieved or reversed to expel the seed(s) from the tip of the canula into the cavities of the germination tray. Prior to the present invention, automated needle seeders caused the percent yield of seedlings to increase. Coupled with better seed stock, the grower was able to achieve superior seedling yields in less time, and at a cost savings, as compared to manually sowing of seeds. However, the yield of seedlings was still not completely acceptable to some growers. Most often the yield of seedlings was attributable to open cells in the germination flat. That is, a cell that did not get a seed sown into it.

After considerable investigation by the record owners of the present invention, it was determined that at least two factors contributed to "open cell" conditions during the seed sowing operations using needle seeders. First, it was determined that the manner in which needle carrier, and thus the needles, moved to the sowing position entailed a non-linear movement. That is, the needle carrier traveled up and over an obstacle or step to a substantially horizontal position. This movement "over the hump" caused a slight jarring of the seed attracted to the cannula which often resulted in the seed becoming dislodged from the tip of the cannula causing it to fall off before it was released into the cell of the germination tray, thereby resulting in an open cell.

The second problem relates to the manner in which the other commercially available needle seeders handled seed dust which is inherent in all large bulk quantities of seed. The seed dust was found to have been readily mixed and inseparable from the seed stock allowing the dust to be sucked into the cannula and deposited into the germination tray instead of a seed, or the dust clogged the cannula preventing it from capturing a seed. Often times a clogged cannula is not discovered until several flats had been processed which resulted in numerous open cells.

Thus, in automated seeding operations a device which would be most desirable would minimize the possibility of open cell conditions. In this manner the grower maximizes his growing efficiency and yield of seedlings after they have germinated. With regard to the aforementioned problems, when a seed is dislodged from its cannula by the travel of the seed carrier assembly, an open cell or cavity is the result. Similarly, when seed dust clogs or takes the place of a seed, this too means an open cell in the germination flat. Open cells in germination flats result in wasted growing space to the grower and wasted material in the nature of soil mixtures filling their cells or cavities not having a seed for germination, and thus lower seedling yields and lost profits.

Accordingly, a needle type automated seeder constructed in such a manner as to separate seed dust from the seeds to be sown, and move its seed carrier assembly smoothly and without jarring or the seeds captured by the needle cannula would be an desired by the grower and user of such a machine.

SUMMARY OF THE INVENTION

The process of manually placing a single seed into a germination tray having for example 288 or 512 cavities is known to be tedious and difficult. Often times the seeds are extremely small making them barely visible to the naked eye. An apparatus capable of automatically grasping and taking possession of such seeds and depositing them singly or in a group into each cavity is preferred and the only practically acceptable manner of growing seedlings in the larger or more productive nursery or greenhouse environments.

The present invention and its sub-assemblies are directed to an apparatus or device capable of using vacuum suction to remove a vegetation seed from a reservoir thereof defined by the boundary of a tray and depositing it into a germination flat or container filled with soil.

The inventive apparatus is generally comprised of a frame having a support system including a plurality of vertical and horizontal support members. The vertical and horizontal support members are used to elevate a deck with its various components and sub-assemblies attached thereto, to a working height above the ground.

The preferred embodiments of the present invention further comprise a substantially horizontal deck including a continuous moving belt mechanism. The belt is used to transport trays or "flats" used to germinate seeds until they are partially grown (hereinafter "seedlings"). Associated with the deck and the continuous belt is a plurality of subassemblies or components.

In use an empty soil filled flat is placed on the continuous belt of the deck and is shuttled along until it contacts a toggle type indexing switch. In the preferred embodiment the switch is highly sensitive and includes a toggle flap lever which actuates the switching function of the switch. The switch is mounted on the shaft of a hydraulic cylinder so that its elevation above the belt and deck may be varied during operation of the inventive apparatus. The toggle flap lever may therefore be lowered into and out of communication with the flat in order to trigger the switch or enable the flat to pass beneath the switch unimpeded.

As the tray is shuttled along the continuous belt a dibbler assembly is actuated in a similar up and down reciprocal manner by its own hydraulic or pneumatic cylinder. The dibbler includes dibbling cones which create depressions in the soil within the cavities of the tray when it is moved downward toward the tray. The dibbling function is provided to redistribute the soil within the cavity to create a seed receiving depression. This soil distribution is known to be useful for proper seed germination as it provides a uniform barrier of growing media around the seed.

Once a tray is shuttled past the indexing switch and each cavity of the tray is dibbled by the dibbler assembly the tray is then moved along the deck by the movement of the continuous belt until it reaches a seed capture assembly. As the dibbled tray or flat leaves the dibbling assembly, a sensor recognizes the vacancy beneath the indexing assembly and then to the dibbler assembly as described above. Thus, all of the components associated with the seeder invention apparatus are useful for continuous deposition of seeds into the flat on a production line basis.

The preferred embodiment of the seed capture assembly includes a seed shuffler assembly and a seed extraction assembly. The preferred seed shuffler assembly further comprises a vertically mounted industrial vibrator including a vibrating shaft and rubber bushings. Mounted in this manner the shaft is substantially parallel to the back wall of a seed tray. The continuous vibration of the industrial vibrator transmits a vibrating motion to the back wall of the seed tray and causes the seeds within the seed reservoir of the seed tray to circulate or be "shuffled".

This shuffling is believed to be quite remarkable and unique in that the seeds along the front wall portion of the tray have a tendency to nigrate move rearward up the incline of the tray toward the back wall and underneath the depth of the seed reservoir. The floor of the seed tray is angled downward, yet the seeds are shuffled and move rearward up an incline of the floor. When the seeds contact the rear wall they ride at the top of the quantity of seed within the seed reservoir thus migrating to the front wall and begin the reversal of direction as described.

This continuous shuffling motion of the seeds is beneficial as it enables the operator to place a large quantity of seeds within the tray without fear of the quantity of seeds gathering at the front wall and spilling over the side and front walls of the tray, as well as to maintain a constant depth of seed within the seed reservoir. The constant depth and the aforedescribed shuffling is believed to be accomplished by the vertical positioning of the vibrator, its attachment to the seed tray which has a unique configuration, as well as the user selected operating frequency of the vibrator.

The other primary component of the seed dispensing assembly is a seed capture assembly. The seed capture assembly preferably includes a cylindrical vacuum bar having a plurality of nozzles projecting therefrom. The bar is sealed to the outside atmosphere so that it can be pressurized internally either with a vacuum or an increased air pressure. Depending upon the direction of air input or extraction (vacuum) through each nozzle seeds may extracted from the tray as mentioned or be ejected from the needle assembly attached thereto (described below).

Attached to each nozzle of the vacuum bar is a needle assembly comprising a needle base which is engage able with the nozzle, and a cannula extending therefrom. Accordingly, in the seed selection and extraction phase the cannula is inserted into the seed reservoir to capture a single or a plurality of seeds and a vacuum pressure is created at the distal open tip of the cannula. The vacuum pressure at the cannula tip causes a seed to be drawn to the cannula opening. The interior diameter of the cannula should therefore be selected by the user to be smaller than the size of the seed to be extracted from the tray. As the cannulas are removed from the seed reservoir by a corresponding movement of the vacuum bar up an incline in response to the movement of a cylinder shaft attached to the vacuum bar at a regulator block interpositioned therebetween, the seeds cling to the ends of cannula and remain so until the vacuum pressure is relieved or reversed.

When the vacuum pressure is relieved or reversed, air is allowed to flow out the distal end of the cannula causing the seed to be released or ejected from the tip. As the seed or seeds are ejected from the cannula they are directed toward a seed funneling cartridge. The cartridge is generally parallel with the vacuum bar and includes a plurality of funneled bores into which the seeds are dropped. Gravity causes the dropped seeds to move through the bores and in the cavities of the dibbled tray lying there beneath.

In its preferred form the funnel cartridge has a larger inlet opening than an exit opening resembling a tapered or funneled bore to more accurately direct the released seed and allow for greater error when dropping the seed from the cannula. An angled upper surface of the funnel cartridge is believed to be advantageous as it can more easily assimilate the angle of the ramp traveled by the vacuum bar. Once a row of seeds has been deposited into their respective cavities lying immediately below the bores of the funnel cartridge the trays are indexed forward along the deck by the movement of the continuous belt which is regulated by the indexing assembly mentioned above.

This process is continued until the seed or flat supply is exhausted, or the user shuts off or disengages the machine. As the flats exit the seed dispenser assembly they move along the deck with the continuous belt in the manner mentioned above. As the pre-dibbled soil within the cavities of the tray now contain a single or plurality of seeds, depending upon the planting operation selected by the user, a layer of growing media such as soil is deposited over the seed and fills the remainder of the well in which the seed then resides.

After having been topped off with soil, the trays are indexed along the deck by the motion of the continuous belt and removed from the deck or to another piece of equipment which is placed in adjacent alignment to the deck and the continuous belt. The adjacent equipment may include a device such as a watering tunnel designed to wet the growing media in which the seed was sewn.

There are numerous objects, features and advantages associated with the present invention and its components and subassemblies. All of the objects, features and advantages stated below, and those not stated, are intended to be exemplary in nature and are not intended to be construed as limiting in any way upon the scope of the disclosure or the claims set forth and appended to herein below.

It is an object of the present invention to provide a needle seeder apparatus having a linear actuated seed capture assembly.

It is an object of the present invention to provide a needle seeder apparatus having a toggle switch indexing assembly.

It is an object of the present invention to provide a needle seeder apparatus with a seed shuffling assembly to enable a user to establish a uniform seed reservoir and seed shuffling within a seed tray which comprises a component thereof.

It is an object of the present invention to provide a seed shuffling apparatus and assembly capable of motively transporting the seeds within a seed tray in order to enable the seed dust which is inherent within a supply of seeds to be separated from the quantity of seed within the reservoir of the tray.

It is an object of the present invention to provide an automated needle seeder apparatus capable of continuously shuttling germination flats along a deck and enable successive operations such as dibbling, seed deposition and soil covering to take place in automated manner.

It is an object of the present invention to provide a linear actuated seed dispensing assembly with linearly placed ramps on which a vacuum bar may be reciprocated during the capture and release and therefore the deposition of a seed in a seedling germination tray.

It is an object of the present invention to provide an apparatus capable of selecting a single or a plurality of seeds from a reservoir thereof and depositing them into a seed germination flat or tray.

It is an object of the present invention to provide an automated apparatus capable of being adjusted for a plurality seed sizes and geometries as well as flat dimensions as selected by the user.

THE BRIEF DESCRIPTION OF THE DRAWINGS

FIG. 4B is a side view of the tray indexing assembly shown in FIG. 4A, and

DESCRIPTION OF THE PREFERRED EMBODIMENT(S)

Figure 1:
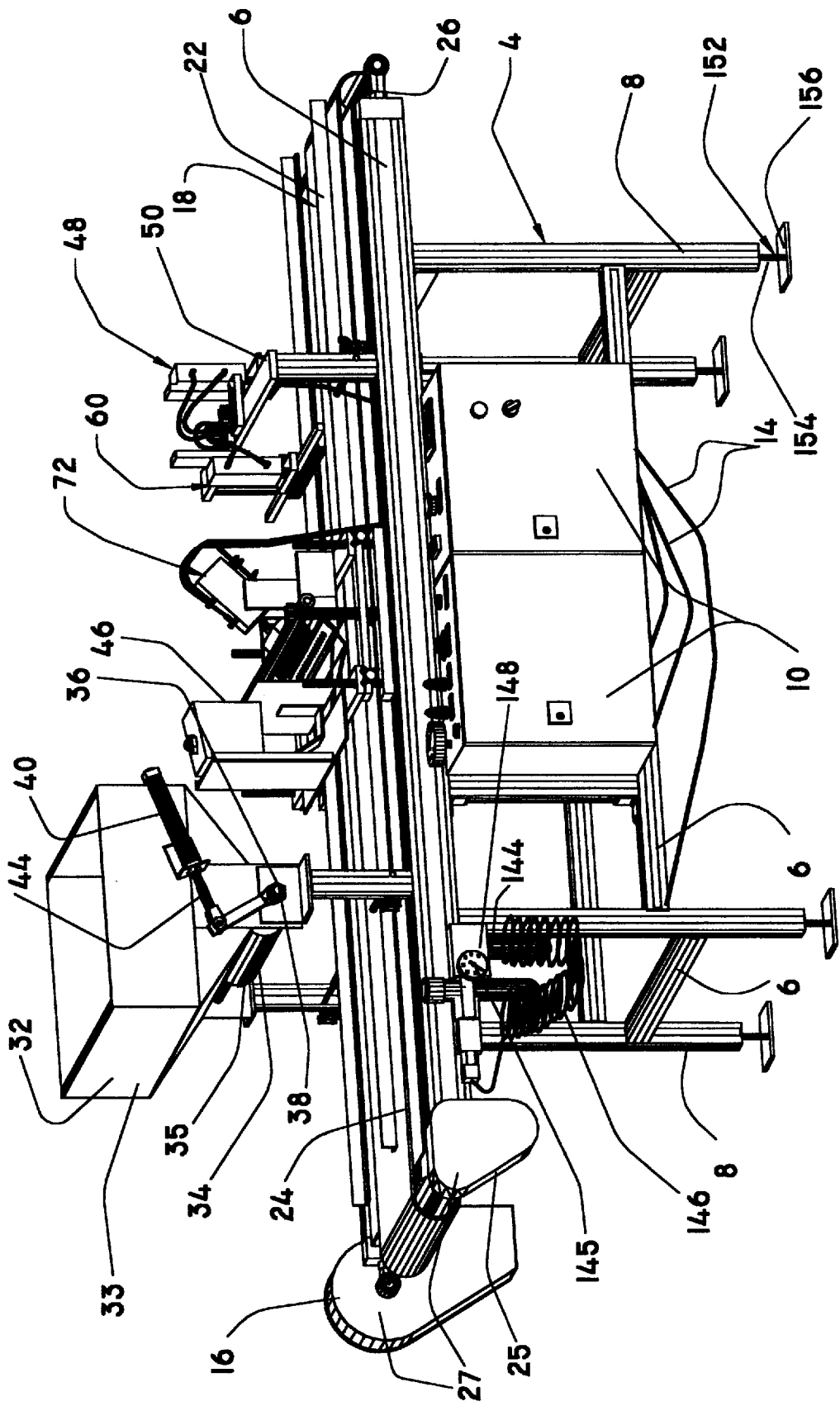
FIG. 1 is an elevated perspective view of an embodiment of the present invention.
Figure 2:
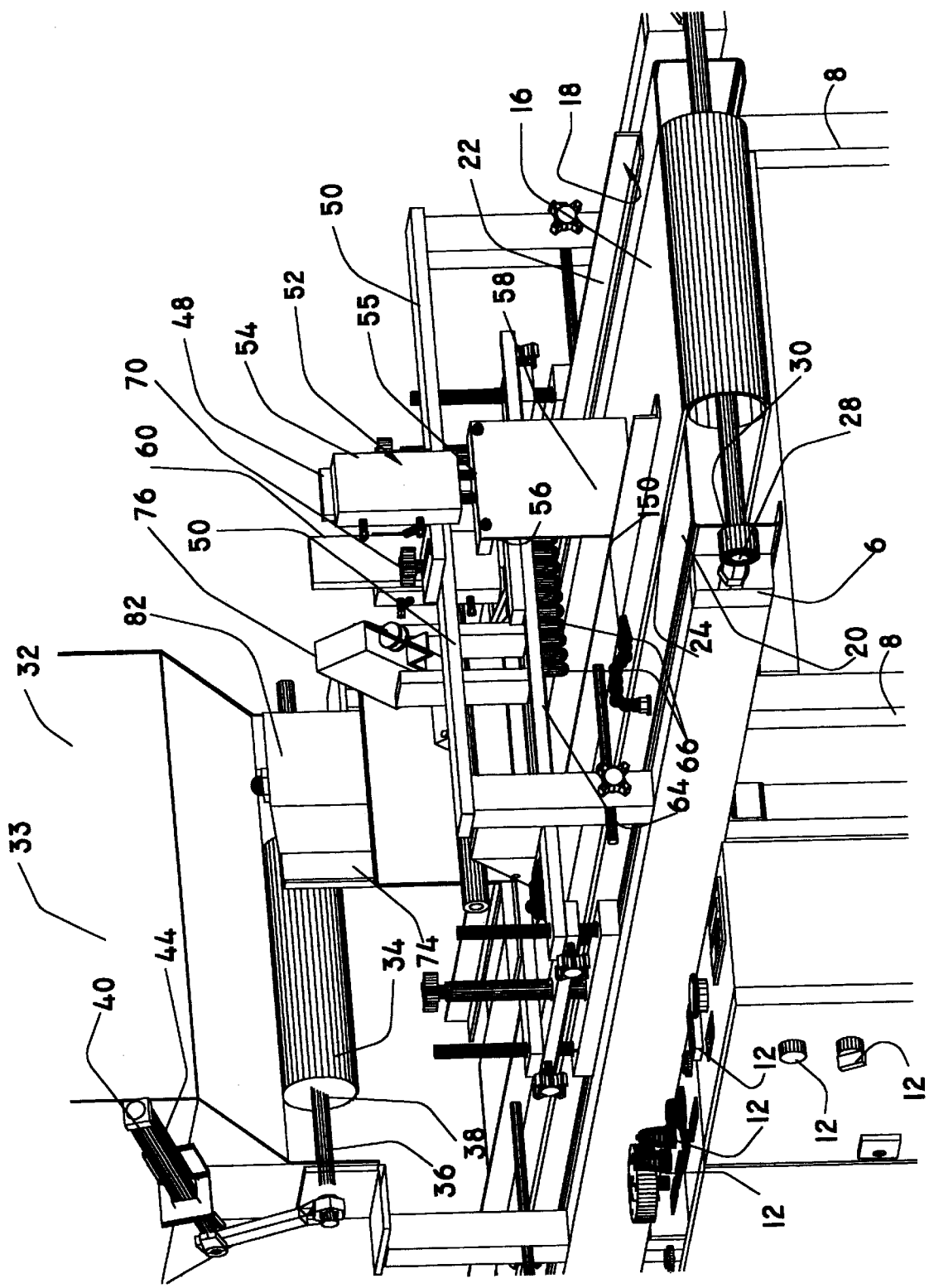
FIG. 2 is an elevated perspective view of the embodiment of the invention shown in FIG. 1 but more closely showing the key assemblies comprising a portion thereof.

The preferred embodiments will now be described with reference to the accompanying drawings. With reference to FIGS. 1 and 2 an embodiment of the inventive seeder is designated generally by the reference numeral 2. The seeder 2 partially comprises a frame 4 made up of a plurality horizontal frame segments 6 and vertical frames segments 8. A control box, shown as a plurality of control boxes 10, are attached to the frame to provide support for the boxes. The control boxes typically include a variety of switches 12 and electrical connections 14 to provide the necessary energy to power and operate the seeder 2.

Situated and supported by the horizontal and vertical segments 6 and 8 respectively of the frame 4 is a belt assembly 16. The belt assembly comprises spaced apart sides 18 and a deck 20 interpositioned therebetween. Adjustable rails 22 provide a means of separation to accommodate a plurality of flats 158 having different dimensions as will be described herein below.

Over the deck 20 lies a continuous belt 24 having rollers 26 at each of its ends to enable the continuous belt to move across and beneath the deck 20. A drive assembly 25 having drive covers 27 is used to power the belt 24. The rollers are supported by shafts 28 which are held in operable space by bearings 30 to reduce friction. Elevated above the deck by vertical supports 8 is a soil delivery dispenser generally designated by the reference numeral 32.

This soil delivery dispenser 32 includes a soil hopper 33 with an exit port (not shown) into which a quantity of soil (not shown) can be placed and dispensed respectively. The soil delivery dispenser 32 includes a dispensing roller 34 having a plurality of longitudinal grooves 35 formed therein. Grooves 35 enable soil to be extracted from the reservoir and dump it onto the flat 158 waiting on the belt moving across the deck 20 during operation. The dispensing roller 34 is supported by a shaft 36 also having bearings 38 to provide friction reducing rotation. Also associated with the soil delivery dispenser 32 is an adjustable linkage generally designated by the reference numeral 40.

The adjustable linkage 40 determines the quantity and amount of the soil dispensed from the reservoir. The linkage further comprises a lever 42 attached to the shaft 36 and a cylinder 44 attached to the other end of the lever 42 which in turn is controlled by an air supply line to enable the cylinder to reciprocate in and out and adjust the dispensation of soil from the reservoir as required and demanded by the user.

Figure 4A:
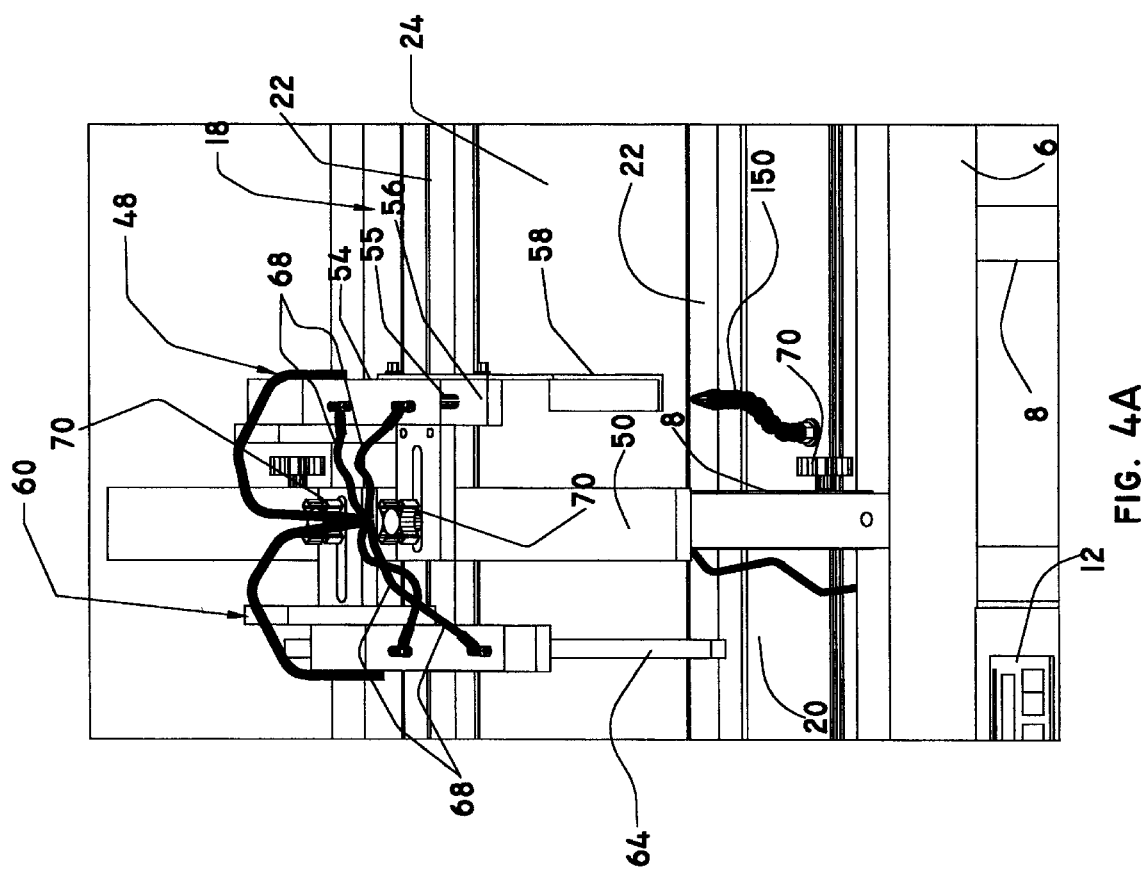
FIG. 4A is an elevated perspective view of a tray indexing assembly which comprises a portion of the embodiment of the invention shown in FIGS. 1 and 2.

Opposite the soil dispensing assembly and designated generally by the reference numeral 48 is a sub-assembly referred to as a tray indexing assembly. The tray indexing assembly 48 is best shown in FIGS. 2, 4A, and 4B. With reference to those Figures the tray indexing assembly 48 includes a primary cross member 50. Member 50 is used to support a variety of the components of the tray indexing assembly 48 and preferably including a switch assembly designated generally by the reference numeral 52, a hydraulically reciprocating shaft 55, a switch 56 for actuation and deactivation of the various components, as well as an actuator flap 58 extending from the switch 56 and in an operable toggling engagement therewith.

Another of the primary components comprising tray indexing assembly 48 is a reciprocating dibbler assembly designated generally by the reference numeral 60. The dibbler assembly 60 includes a cylinder shaft 62 a dibbler platen 64 from which a plurality of spaced apart and linearly spaced apart dibbler cones 66 project. A series of electrical connections 68 and vacuum supply lines 142 and adjustments knobs 70 enable the dibbler assembly 60 as well as the indexing assembly 48 to be positioned by the user in conjunction with the configuration of the germination flat being used.

Interpositioned between the soil delivery dispenser 32 and the dibbler assembly 60 is a seed dispenser assembly designed generally by the reference numeral 72. The seed dispenser assembly 72 preferably includes two primary components: a seed shuffling assembly designated generally by the reference numeral 74, and a seed capture assembly designated generally by the reference numeral 76.

Both the seed shuffling assembly 74 and seed capture assembly 76 are supported and adjusted by virtue of the cross members 78 and adjustment knobs 80 in the manner which will be described herein below. The seed shuffling assembly includes a vibrator assembly 82 partially comprising a vibrator 83 positioned so its vibrating shaft 84 is substantially vertical to the mounting plate 86 having a horizontal surface 88 which is attached to a tray 92.

The tray 92 has spaced apart sides 94, a front 96, an angled bottom portion 98 and a back 100. An attachment bracket 102 is interpositioned between the back 100 and a portion of the mounting plate 86. Bushings (not shown) provide a relatively silent operation of the vibrator assembly 82 as the bushings are interpositioned between the attachment bracket 102 and the back 100 of the tray 92.

With reference to the seed capture assembly 76, it includes a linear actuation cylinder 106 supported on the cross member 50 by vertical supports 108. Its angle of adjustment as well as its travel is regulated by the user by virtue of the adjustment rod 110 having a shaft 112. Extending from the shaft 112 is a vacuum bar assembly designated generally by the reference numeral 114. The vacuum bar assembly 114 further includes a regulator block 116 interpositioned between the shaft 112 and a substantially hollow pressurizeable rod 118 as will be described herein below.

The substantially cylindrical hollow rod includes a plurality of nozzles 120 extending therefrom. The nozzles 120 are positioned in a linear alignment and are configured to receive a needles assembly 122 further comprising a cap 124 and a cannula 126 extending therefrom. Of course, if the user desires to seal off a particular nozzle 120 a blind cap (not shown) can be attached to the nozzle to prevent the escape or introduction of air to or from the nozzle 120 and the hollow rod 118.

With the reference to the cannula 126 it preferably includes a linear proximal portion 128 and an angled distal portion 130 extending therefrom. During operation, as will be more thoroughly described herein below, the vacuum bar assembly 114 operates in a reciprocal relationship along a linearly angled ramp assembly designated generally by the reference numeral 132. The linearly angled ramp assembly 132 further comprises spaced apart ramp components 134 preferably including a polyethylene or some polymeric runner component 136 to reduce frictional contact between the vacuum bar 114 which is typically a metal such as aluminum and the ramp structure 132 which is also preferably a metal such as aluminum.

Figure 3:
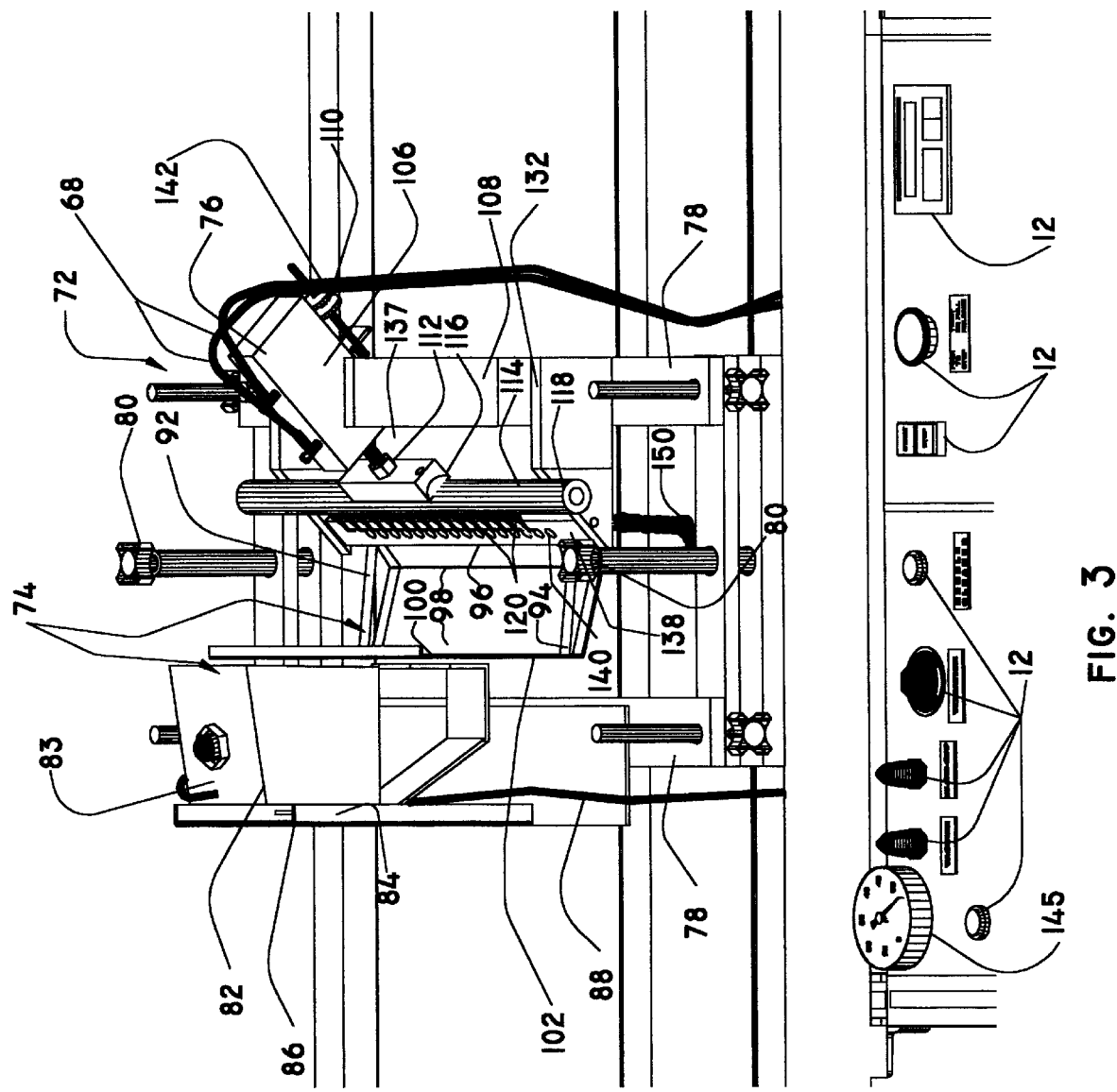
FIG. 3 is an elevated perspective view of the seed capture assembly of an embodiment of the present invention shown in FIGS. 1 and 2.

A funnel cartridge 138 having a plurality of seed delivery bores or funnels 140 is positioned in operable alignment with the reciprocating vacuum bar 114 but more particularly the hollow rod 118 and the needle assemblies 122 such that during its operating stroke from the first position wherein the shaft 112 is extended or withdrawn the cannulas 126 overlie an individual seed delivery bore 140. An optional seed vacuum 144 having a vacuum gauge 145 (like that shown in FIG. 3), hose 146 and nozzle 148 combination, is provided for easy removal of the seed from the seed tray 92. In addition, optional elevator legs, designated generally by the reference numeral 152, may be provided to enable the user to adjust the working height and ensure a level work surface of the apparatus. The legs 152 further comprise threaded posts 154 and ground engaging pads 156.

Mode of Operation

In use the present invention and its components operate in an assembly line or automated assembly type fashion. Referring generally to the FIGS. 1–3, 4A–4B, and FIG. 5. After the present invention is set up and connected to a supply of electrical power by virtue of electrical connections 14 the user adjusts or energizes the machines by the various switches 12, the machine is started by the user who then places a quantity of seed into the seed tray 92.

Figure 5:
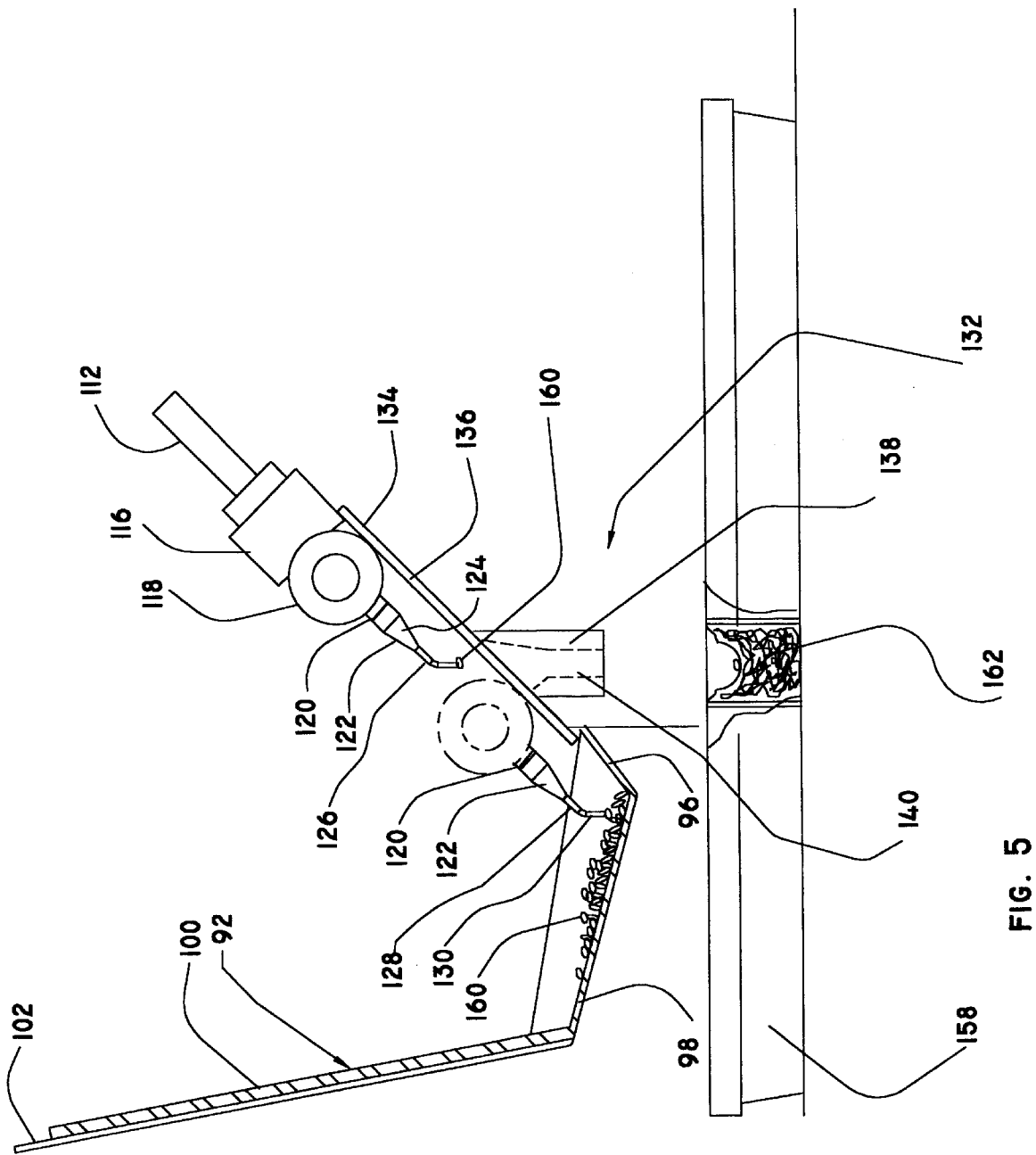
FIG. 5 is a side partially cross sectional representational view of some of the key features of the seed dispensing assembly of FIG. 3.

The user then adjusts the vibratory speed of the vibrator assembly 82 in order that seed 160 of FIG. 5 establishes and maintains a relatively uniform depth within the seed tray. The frequency of vibration is believed to be different for the various types of seed based on their size, weight, and geometry. Accordingly, after the user selects the appropriate frequency to provide the rolling or continuous shuffling action of the seed 160 within the tray. A series of flats 158 are placed upon the belt assembly 16 but more particularly the continuous belt 24 as the trays are indexed along the deck 158. When the trays 20 are indexed to the point where sensor light pipes 150 (FIG. 4A) recognize a tray 158 resting on the continuous belt 24 the machine begins its actuation cycle. The tray is continued to be indexed along the belt 24 until it contacts the actuation flags 58 of the tray indexing assembly 48.

When the tray 158 contacts the actuator flap 58 of the indexing assembly 48 the dibbler assembly 60 is actuated and raised. As the switch 56 and its actuator flap 58 extending therefrom is raised by virtue of retraction of the cylinder shaft 55 within the signal box 54 the tray 158 is allowed the pass there beneath. When the tray reaches the dibbling station and its oscillatory rate equal to the speed at which the tray 158 passes there beneath the dibbler assembly 60 causes the dibbled cones 66 to press down into the soil 162 within the compartments 163 of the tray 158. In this manner the soil is depressed within the cell 162 to receive a seed. This indexing and dibbling continuous for each of the compartments of the tray 158. Of course, the number of dibbling cones placed upon or situated to partially comprise the dibbler platen 64 correspond to number of cell compartments of the tray 158 across its width.

After a particular tray is dibbled it travels from beneath the dibbler assembly 60 and moves along the deck 20 while it rides on the continuous belt 24 until it enters the seed dispenser assembly 72 when light pipe sensor 150 detects its presence. At this time the vacuum bar assembly is driven down the ramps 134 as it rides on the poly runners 136 enabling the cannula portion 126 of the needle assemblies 122 to be inserted within the reservoir of the tray 92 to take possession of a seed or seeds 160.

The cannula is immediately and automatically withdrawn from the seed reservoir as the vacuum bar 114 is pulled rearward up the ramps 134 by virtue of the retraction of the cylinder shaft 112 attached to the hollow rod 118 by virtue of the regulator block 116 interpositioned therebetween. At this time the vacuum bar is at its sowing and seed release position. The vacuum suction at the tip of the cannula 126 is released or reversed enabling the seed(s) 160 to drop or be expelled from the tip of the canula and into the funnel bores 140 of the funnel cartridge 138 and into the cells 162 of the flat 158 (FIG. 5).

After all of the cells 162 of the flat 158 have received a seed 160, the belt assembly 16 shuttles the flat to the soil delivery dispenser 32, which includes the soil hopper 33 with an exit port (not shown). The soil dispensing roller 34, having a plurality of longitudinal grooves 35 formed therein, rotates to dispense soil from the hopper 33 by removing an amount of soil sufficient to fill the groove 35 when the roller 34 turns each successive groove into contact with the soil (not shown) within the hopper 33. The soil is then dispensed over the well of soil 162 and seed 160, but it is not compacted in order to facilitate aeration of the germinating seed and a soft medium from which the foliage may grow. The adjustable linkage 40 determines the quantity and amount of the soil dispensed from the reservoir.

These and other embodiments of the present invention shall become apparent after consideration of the scope of the specification, drawing and claims presented herein. All such embodiments and equivalents are contemplated and believed to the be within the scope of the present invention whose only limitation is the scope of the appended claims.

What is claimed is:

1. A linear actuated needle seeder, comprising:

a frame;

a seed dispenser assembly further including a shuffler assembly and a capture assembly, the shuffler assembly further comprises:
   an energizeable vibrator having a top portion and a bottom portion, and
   a seed tray attached to the vibrator and having a back wall portion;

the capture assembly further comprises:
   a master cylinder supported by the frame and having a cylinder shaft with spaced apart ends operably extending therefrom;
   a vacuum bar attached to the cylinder shaft,
   a slide extending upwardly above the frame and having a slide surface angled in a linearly downward direction toward the seed tray and positioned to enable the vacuum bar to rest thereon and oscillate between an up position and down position in response to a reciprocating movement of the cylinder shaft, and
   a plurality of orifices positioned along the vacuum bar each of which is configured to receive a cannulated needle having a free end and an attachment end such that when the attachment end of the needle is placed in communication with the orifice an air flow channel is established and moves from a hollow interior of the vacuum bar through a cannula and out to the atmosphere.

2. The seeder of claim 1, such that:
   the vibrator further includes a vibrator shaft which is positioned substantially parallel with the back wall portion.

3. The seeder of claim 1, wherein the vacuum bar further includes:
   a plurality of nozzles extending from the vacuum bar and interpositioned between the vacuum bar and the attachment ends of the needles.

4. The seeder of claim 1, wherein the vacuum bar further includes:
   a regulator block interpositioned between the vacuum bar and the cylinder shaft of the master cylinder.

5. The seeder of claim 1, wherein the slide further includes:
   a friction reducing component attached to the angled surface.

6. The seeder of claim 1, further including:
   a moving belt assembly supported by the frame.

7. The seeder of claim 1, further including:
   a soil dibbler assembly.

8. The seeder of claim 7, wherein the soil dibbler assembly further includes:
   a dibbler platen having a plurality of dibbling cones extending therefrom.

9. The seeder of claim 1, further including:
   a soil dispenser assembly.

10. A linearly oscillating seed capture apparatus, comprising:
    a support platform;
    a reciprocating cylinder connected to the support platform and having a reciprocating cylinder shaft,
    a vacuum bar attached to the cylinder shaft,
    a slide extending upwardly above the support platform and having a slide surface angled in a downward direction toward a seed tray and positioned to enable the vacuum bar to rest thereon and oscillate between an up position and down position in response to the reciprocating movements of the cylinder shaft, and
    a plurality of orifices positioned along the vacuum bar each of which is configured to receive a cannulated needle having a free end and an attachment end such that when the attachment end of the needle is placed in communication with the orifice an air flow channel is established and moves from a hollow interior of the vacuum bar through a cannula and out to the atmosphere; and
    a mover of air sufficient to selectively establish an air suction condition at the plurality of orifices and the free end of the cannulated needles when they are attached to the vacuum bar enabling seeds to be captured by and released from the free ends of the needles.

11. The linearly oscillating seed capture apparatus of claim 10, further comprising:
    pivot means for pivotally attaching the reciprocating cylinder to the support platform.

12. The linearly oscillating seed capture apparatus of claim 11, such that:
    the attachment of the vacuum bar to the cylinder enables the vacuum bar to rotate in response to pivotal movements of the reciprocating cylinder.

13. The linearly oscillating seed capture apparatus of claim 10, such that:
    the reciprocating cylinder is configured to enable a user to adjust the rate of reciprocation of the shaft.

14. A linear actuated needle seeder having a support frame, comprising:
    an energizeable vibrator having a vibrator shaft, a top portion and a bottom portion;
    a seed tray attached to the vibrator shaft;
    a master cylinder having a reciprocating cylinder shaft;
    a vacuum bar attached to the cylinder shaft;
    a slide extending upwardly above the frame and having a slide surface angled in a downward direction toward the seed tray and positioned to enable the vacuum bar to rest thereon and oscillate between an up position and a down position in response to the reciprocating movements of the cylinder shaft, and a plurality of orifices positioned along the vacuum bar each of which is configured to receive a cannulated needle having a free end and an attachment end such that when the attachment end of the needle is placed in communication with the orifice an air flow channel is established and moves from a hollow interior of the vacuum bar through a cannula and out to the atmosphere.

15. The linear actuated needle seeder of claim 14, wherein the seed tray further comprises:

a seed reservoir formed by a floor bounded by a continuous wall, wherein the floor is angled in a direction downward and toward the master cylinder.

16. The linear actuated needle seeder of claim 14, wherein the vibrator further comprises:

a frequency variable vibrator configured to be adjusted by a user to enable the frequency of vibration of the vibrator to vibrate a seed tray at an optimum rate in order to cause seed within the reservoir to undergo a rotational migration within the reservoir, despite the angle of the floor and the gravitational tendency of the seed to slide down the angled floor when the seed tray is not vibrated, by maintaining the seed placed within the reservoir at a substantially uniform depth as measured with respect to the area of the floor covered by the seed.

* * * * *